United States Patent
Redkokashin

(10) Patent No.: US 11,165,584 B2
(45) Date of Patent: Nov. 2, 2021

(54) METHOD FOR TRANSMITTING PERSONAL INFORMATION

(71) Applicant: Ilya Vladimirovich Redkokashin, Rostov-on-Don (RU)

(72) Inventor: Ilya Vladimirovich Redkokashin, Rostov-on-Don (RU)

( * ) Notice: Subject to any disclaimer, the term of this patent is extended or adjusted under 35 U.S.C. 154(b) by 0 days.

(21) Appl. No.: 16/629,030

(22) PCT Filed: Jun. 5, 2018

(86) PCT No.: PCT/RU2018/000364
§ 371 (c)(1),
(2) Date: Jan. 6, 2020

(87) PCT Pub. No.: WO2019/009762
PCT Pub. Date: Jan. 10, 2019

(65) Prior Publication Data
US 2020/0235933 A1 Jul. 23, 2020

(30) Foreign Application Priority Data

Jul. 7, 2017 (RU) .............................. RU2017123996

(51) Int. Cl.
| | |
|---|---|
| *H04L 9/32* | (2006.01) |
| *H04W 8/20* | (2009.01) |
| *H04L 29/06* | (2006.01) |
| *G06F 21/31* | (2013.01) |
| *G06F 21/32* | (2013.01) |

(52) U.S. Cl.
CPC .......... *H04L 9/3231* (2013.01); *H04W 8/205* (2013.01); *G06F 21/31* (2013.01); *G06F 21/32* (2013.01); *H04L 29/06809* (2013.01)

(58) Field of Classification Search
CPC ... H04L 9/3231; H04L 29/06809; H04L 9/32; H04L 29/06; H04W 8/205; H04W 8/20; G06F 21/31; G06F 21/32
See application file for complete search history.

(56) References Cited

U.S. PATENT DOCUMENTS

| | | | |
|---|---|---|---|
| 6,205,478 B1 | 3/2001 | Sugano et al. | |
| 6,636,620 B1* | 10/2003 | Hoshino | G06F 3/021 |
| | | | 382/124 |
| 7,640,006 B2* | 12/2009 | Portman | G06Q 30/02 |
| | | | 455/412.1 |
| 7,929,951 B2* | 4/2011 | Stevens | G06F 21/62 |
| | | | 455/414.1 |
| 8,015,118 B1* | 9/2011 | Robinson | G06F 21/32 |
| | | | 705/75 |
| 8,589,440 B1* | 11/2013 | Chaganti | H04L 67/306 |
| | | | 707/783 |
| 2006/0099931 A1 | 5/2006 | Trujillo | |
| 2008/0317292 A1* | 12/2008 | Baker | G06K 9/00885 |
| | | | 382/115 |
| 2012/0297190 A1 | 11/2012 | Shen et al. | |
| 2014/0380040 A1 | 12/2014 | Albahdal et al. | |
| 2015/0358316 A1* | 12/2015 | Cronin | H04L 63/104 |
| | | | 726/6 |
| 2016/0078204 A1 | 3/2016 | Chen | |
| 2017/0257216 A1* | 9/2017 | Perga | G06F 9/54 |
| 2017/0300678 A1* | 10/2017 | Metke | H04L 63/0861 |

FOREIGN PATENT DOCUMENTS

| | | |
|---|---|---|
| RU | 2257613 | 7/2005 |
| RU | 2441270 | 1/2012 |
| RU | 0000117243 | 6/2012 |
| RU | 2015103099 | 1/2015 |

\* cited by examiner

*Primary Examiner* — Jayesh M Jhaveri
(74) *Attorney, Agent, or Firm* — Michael D. Eisenberg

(57) ABSTRACT

The invention relates to the field of computer networks, in particular to mobile technologies. More specifically, the invention relates to methods for transmitting contact and other personal information.
The method of transmitting personal information includes: receiving from a user with his mobile device having a sensor for scanning biometric data, or using specialized registration points equipped with computers with sensors for scanning biometric data, user's contact information and his biometric data, registration of the aforementioned user in the database located on the server, linking contact information to biometric data. And after a request containing a biometric data of a registered user initiated from a mobile device belonging to another user, the server will automatically provide contact and other personal information of the user who owns the biometric data to this mobile device.
The proposed invention provides increasing the speed of contact and other personal information transmission, automatically supplement available personal information on mobile devices, informing users about the activities of other users whose contacts are stored on the device, control of transmission of contact data and other personal information and its' amount, saving time on deleting advertisements from websites after losing their relevance and providing an ability to block access to contact and other personal data stored on the server for users.

15 Claims, No Drawings

METHOD FOR TRANSMITTING PERSONAL INFORMATION

TECHNICAL FIELD

The invention relates to the field of computer networks, in particular to mobile technologies. More specifically, the invention relates to methods for transmitting contact and other personal information.

PRECEDING LEVEL OF TECHNOLOGY

Currently, for the transfer and exchange of contact data, whether it is a phone number, id in messenger or a social network, it is customary to perform a number of actions to record and save contact data.

There is a well-known system «System and method for providing data to a telephone user based on a telephone number entered by user» US 2006/0099931, HO4L 12/58, 11 Jun. 2006. According to this system, a phone number is received from user, then data is automatically received from a remote location based on the phone number and data is displayed for the user. In this case, we are talking about switching to the Internet site using a mobile phone number.

There is also another well-known method «The method of switching to the Internet page and launching the messenger program» RU 2015/103099, HO4W 8/18 30 Jan. 2015. According to this method, you use a mobile device which has an Internet access and installed program with functions of the browser or messenger. You use a dialing field as an input field for specific commands. To the dialing field you input symbols. Then you confirm the entered symbol combination. Then using the system of command verification, the presence of the particular command in database is verified automatically.

In case of presence of the command, the following occurs: information from the Internet site, that corresponds to website address binded to the command is displayed automatically.

Or connection with a specific subscriber, attached to the command, is carried out automatically via Internet connection.

All the commands are input into the database beforehand by attaching a symbol or a specific combination of symbols to the particular website address or messenger function for the further verification of the input symbols. All commands are stored in this database, in which, using the command verification system, these symbols are verified.

And besides, the command database is located completely on the server or on a specific device, or partially on the server, and partially on a specific device, and each individual device is provided with the access to all parts of the database.

These methods are convenient for the exchange of personal information, but have an important disadvantage. The input of symbols, which signify contact information or a command, takes considerable time from the entire process of transmitting or exchanging contact information.

The developer of this personal information transmitting method set the target of development a new method, which, in comparison with analogues, will reduce the time spent on the transmission of contact data and other personal information.

The technical result of the proposed method for transmitting personal information is to increase the speed of contact and other personal information transmission, automatically supplement available personal information on mobile devices, to inform users about the activities of other users whose contacts are stored on the device, to control transmission of contact data and other personal information and its' amount, save time on deleting advertisements from websites after losing their relevance and to provide an ability to block access to contact and other personal data stored on the server for users.

DISCLOSURE OF INVENTION

The essence of the method of transmitting personal information is that, based on the contact information provided by the user and the biometric data belonging to him, the user is registered in the database, and his contact information is linked to the biometric data belonging to the aforementioned user. Then after request, containing biometric data of the registered user initiated from a mobile device, the contact information of the user who owns the biometric data is automatically provided to this mobile device.

In addition to contact information, other personal information provided by the user is also attached to biometric data and provided after request from a mobile device containing biometric data of the registered user. Personal information about each individual registered user can be supplemented by other users. The provided contact and other personal information is automatically saved in the memory of a mobile device, or a social network, or in the messenger contacts database.

When new users are registered, contact and other personal information and biometric data are obtained using personal mobile devices of users equipped with sensors for scanning biometric data. If personal information is supplemented by the registered users about themselves, or by other users, additional personal information is automatically transmitted to all mobile devices which the contact information of the registered user is present on.

And a mobile device, which has a sensor of scanning biometric data and initiating a request containing biometric data of the registered user, is provided with the ability to receive biometric data by scanning biometric data from the registered user they belong to.

Also, mobile devices of users are provided with the ability to transmit and receive biometric data of registered users with each other.

Before transmitting biometric data of the registered user from one mobile device to another, mobile devices are provided with the opportunity to initiate a request, addressed to the registered user, who owns the biometric data for transmission, for permission to transmit his biometric data and to generate a response by the aforementioned registered user who owns the transmitted biometric data that allows or prohibits the transmission of the above data. And only after receiving a response containing permission to transmit the aforementioned biometric data it is possible to transmit biometric data from one mobile device to another mobile device.

Before transmitting biometric data from one mobile device to another, to determine the mobile device to which biometric data is transmitted, it is possible for the mobile device that transmits biometric data to scan the biometric data of the owner of the mobile device to which the biometric data is transmitted.

When transmitting personal information through announcements or advertising, personal information about a registered user is transmitted in the form of temporary identifiers with a certain shelf life, and permanent identifiers are transmitted only after permission of the user who owns the permanent identifiers. Databases, located on personal computers and servers with sensors for scanning biometric data, that store users' personal data, are provided with the ability to receive automatically personal information after a request containing biometric data of a registered user.

EXAMPLE OF A SPECIFIC APPLICATION OF THE INVENTION

The announced method of transmitting personal information is as follows.

To implement the claimed method, the user is requested for contact and other personal information and biometric data for registration.

Next the user is registered in the database by linking his contact information, such as phone number, address, identifiers of messengers, social networks, etc., as well as other personal information, such as last name, first name, middle name, place of work, hobbies, etc., to biometric data, such as fingerprints, timbre, retina, etc., belonging to the aforementioned user.

The database is located on the server.

User registration can be done at specialized registration points, and can be done automatically using the user's mobile device who requests the necessary information.

To register using a user's mobile device, the mobile device must have the appropriate software for requesting personal information from the user and server connection, as well as a sensor capable of scanning biometric data.

The role of such sensor, for example, can be performed by a fingerprint scanner.

After user registration for transmitting contact and other personal information, the registered user provides his biometric data to which his personal information is linked, to another user, for example, by putting his finger on a sensor that scans the fingerprints of the user's mobile device to whom personal information of the registered user is transmitted.

A mobile device that reads biometric data should be provided with appropriate software for connection with the server.

After receiving biometric data, the mobile device sends a request to server containing a database of registered users.

Further, on the mobile device, that sent the request to the server, containing the biometric data of the registered user, contact and other personal information of the aforementioned registered user is supplied. If the user, who has received contact and other personal information of a registered user on his mobile device is also registered, then an automatic request may be sent to his mobile device from the server to permit the transmission of his personal information to the mobile device of the user who provided his biometric data.

Thus, if the user confirms the request, the contact and personal information will be exchanged, and in case of refusal, only one user will receive contact and other personal information of the user who provided his biometric data.

Contact and other personal information received from the database can be automatically stored in the contact list of the mobile device, in social networks, in the contacts of the messenger.

Before saving, the confirmation may be required which allows to edit the received information.

This method provides the ability to hide phone numbers and other identifiers in various networks and messengers from users, including from users to whom these identifiers belong.

There are identifiers, but this information is inside the devices and is hidden.

Thus, uncontrolled transmission of other people's contacts is impossible, no one will be able, for example, to transmit phone numbers uncontrollably since no one knows them.

The last name, first name, middle name and other information about the user that is not contact will not be hidden.

To expand the functionality of the method, it is also necessary to transmit the contact and other personal information of the registered user to other users.

For this purpose, an appropriate function in the software of mobile devices is provided.

All mobile devices participating in the process must have sensors capable of scanning biometric data and have a connection with a server storing biometric data, and users of mobile devices must be registered in a database storing personal information.

For example, if user A wants to transmit contact and other personal information of user B, who is not nearby, to user C, the following actions are performed:

User A finds user B in the contact list of his mobile device.

Then he clicks on the "Transmit Contact" function provided in the mobile device.

The mobile device requests to whom it is needed to transmit contact and other personal information of user B and offers to select in the contact list of the user to whom the contact and other personal information of user B will be transmitted, so user A indicates user C as a recipient of the contact and other personal information or if user C is not in the contact list of the mobile device of user A, to indicate the recipient of contact and other personal information of user B, the mobile device offers to scan biometric data of the user to whom the contact and other personal information of user B should be transmitted.

If it is necessary to scan biometric data, such as fingerprints, user C, who wants to receive contact and other personal information of user B, applies his finger, to the fingerprints of which his personal information is attached, to the fingerprint scanner of the mobile device of user A.

The mobile device of user A, having received the biometric data of user C or using data about user C from the contact list of the mobile device, sends a request to the server which contains the identification or biometric data of user C and identification data about user B, whose contact and other personal information they want to transmit.

The server receives the request, and also recognizes the mobile device of user A that created this request.

Next, the server makes a request addressed to the mobile device of user B, whose contact and other personal information is going to be transmitted by user A.

The server request addressed to user B contains information about user's A intention to transmit contact and other personal information to user C, and the ability to approve or reject the transmission of contact and other personal information If user B does not want his contact and other personal information to be transmitted, he rejects the request and the transmission of contact and other personal information is canceled.

If user B agrees to the transmission of contact and other personal information to user C, he approves the transmission and user C receives contact and other personal information of user B.

If an exchange of contact and other personal information is needed, then after the transmission of contact and other personal information of user B to user C, the server sends a request to user C containing a confirmation or refusal to transmit contact and other personal information to user B.

If user C does not agree to transmit his contact and other personal information to user B, he refuses the request.

If user C is ready to transmit his contact and other personal information to user B, he confirms the transmission of his contact and other personal information to user B.

After user C confirms the transmission of his contact and other personal information, user B receives contact and other personal information of user C from the server.

Thus, the exchange of users' contacts through friends will occur.

A request for confirmation or rejection of the transmission of contact and other personal information can be created not only by the server, this function can be performed, for example, by a device that contains contact and other personal information that must be transmitted.

Based on the example above, the request, which was created by the server for user B, with the ability to confirm or reject the transmission of contact and other personal information to user C, could be also created by a mobile device of user A.

And after confirmation of the transmission by user B, without the participation of the server, directly transmit contact and other personal information or biometric data of user B to user C by any means of communication and authentication, from the mobile device of user A to the mobile device of user C.

For example, using wi-fi, Bluetooth, etc.

Also, one of the mobile devices, for example of user B or user A, can send a request for the exchange of contact and other personal information to the mobile device of user C, so that user B also receives contact and other personal information or biometric data of user C.

If biometric data were transmitted to the mobile device, the mobile device that received the above data also makes a request to the server on which contact and other personal information of registered users is stored to obtain contact and other personal information of the user who owns the biometric data.

In these examples, the exchange of contact and other personal information means that participants will receive contact and other personal information about each other.

The transmission of contact and other personal information means that only one user will receive the aforementioned information.

Due to hidden identifiers (phone numbers and other id) and confirmation of the transmission of contacts, it becomes possible for user to control completely the transmission of contact and other personal information related to it.

On the basis of information about the transmission of contact and other personal data it is also possible to build various kinds of statistics, for example, which of the users most often transmits it, etc.

Also on the basis of knowledge about the transmission of contact and other personal information by users, we can make conclusions about cases of unfair receipt of contacts.

For example, if a user's mobile phone is undergone to a hacker attack and the contact and other personal information of a registered user gets into hands of users who did not participate in the transmission or exchange of contact and other personal information belonging to the aforementioned user, it will be impossible to contact the user whose contact and other personal information is stolen, as the server will be able to distinguish users who shouldn't have access to contact and other personal information of the aforementioned user.

Thus, it is possible to implement the protection of contact and other personal information of a registered user.

To transmit contacts using announcements, Internet sites and advertisements, temporary identifiers are created with a certain shelf life, that also provides control over the transmission of contacts and extends the functionality of the invention.

If a registered user wants, for example, to place an advertisement on the Internet, then in his mobile device he activates a temporary identifier, which is provided by a server storing personal information of the registered user.

This temporary identifier is provided for a short period of time, for example, for a month or several months, and at a certain request of the user also for any necessary period, for example, for an hour or a day.

After receiving the temporary identifier, the user indicates the aforementioned temporary identifier in the advertisement or announcement.

When other users want to contact the user by advertisement, they will use his temporary identifiers.

For example, by entering a temporary identifier in a special input box, or if the advertisement is viewed using a mobile device, simply by clicking on the link button in the ad.

Then the server organizes the connection of users without transmitting contact and other personal information.

Thus, while the temporary identifier is in effect, it is possible to connect users, as soon as it stops working, communication between users is lost, regardless of whether the users were previously connected or not.

If desired, users can also send a request for transmission or exchange of permanent identifiers, and upon confirmation of the user who created the ad, transmission or exchange of contact and other personal information will occur.

In this case, users will be able, if it necessary, to organize a connection between themselves, for example, phone calls, even after the temporary identifier stops to operate using permanent identifiers.

Moreover, the exchange of permanent identifiers can be initiated by both the user who created the advertisement and another user who contacted by the ad using temporary identifiers with the user who created the ad.

And by mutual agreement after confirmation of the exchange of permanent identifiers, there will be an exchange or transmission of contact and other personal information.

As soon as the advertisement is no longer actual, it will be possible to abandon the temporary identifier in advance, and other users who do not have permanent identifiers will lose the ability to contact the user who left the advertisement.

The website on which the advertisement is posted can also automatically receive information from a server, that stores contact and other personal data of registered users, that the temporary identifier is no longer valid and delete the advertisement on its own.

Thus, by deleting the temporary identifier in the mobile device, the user will not have to accept unnecessary calls and look for all the advertisement sites on which he posted, and all these sites will delete themselves information that is not actual no more automatically after receiving information about the irrelevance of the temporary identifier.

For these purposes ads sites can also send requests to a server, that stores contact and other personal data of registered users, with a certain frequency, for example, once per hour, to clarify the relevance of temporary identifiers.

The irrelevance of temporary identifiers can be also found out by sites at the first desire of users to contact the user who created the advertisement.

When registering a user, and later on, user can group information about himself in various data groups.

A data group is user-selected information about himself that he can transmit to other users using the server.

For example, the first data group will contain the surname, first name, middle name and mobile phone number, the second data group will contain the surname, first name, middle name, telephone number and social network identifiers, the third data group will contain the surname, first name, middle name, mobile number, user's post, company in which he works, scope of the company, etc.

For example, different groups of data can be attached to different fingerprints belonging to user.

Further, when transmitting contact and other personal information, the user can decide which group of data the other user will receive by attaching the appropriate fingerprint.

And when transmitting contact and other personal information initiated without the participation of the user, when the user confirms the permission to transmit, the user has the opportunity to choose which data group to transmit from the list that appears on the screen of his mobile device.

Besides the server, the database can be located, for example, on each separate mobile device.

Permanent identifiers owned by organizations may not be hidden, or temporary identifiers may be issued for a very long period of time, for example for 10 years or more.

In other words, organizations can use permanent or temporary identifiers for advertising, which are entered as a phone number in the appropriate dial field of a mobile device and can be stored in the contacts list of mobile devices, while the server can also provide information about the company to mobile devices of users who have saved the contact of organization in their contact list.

Also, for transmission of contact and other personal information of the organization, various codes and pictures that can be identified from the camera of a mobile device can be used. For example, QR codes.

Organizations can also use, for example, fingerprints of its employees to transmit contact and other personal information.

In this case, the user can simultaneously be associated both with contact and other personal information relating to the user, for example, attached to the thumbprints of the right hand, and with contact and other personal information regarding for the organization in which the user works, for example, attached to the thumbprint of the left hand.

In one embodiment of the invention, on mobile devices of users only one identifier of each individual user or organization is stored, which, in turn, can be hidden inside the mobile device and is not available for viewing.

In other words, on his mobile device user A will only have one identifier of user B and personal information not including other identifiers of user B, for example, information such as last name, first name, middle name, activity, hobbies, etc.

The only identifier that will be stored on the mobile device will distinguish user B from other users registered on the server.

And all user B identifiers such as mobile phone number, identifiers of social networks, instant messengers, etc., will be stored only on a server that will connect different users to each other every time using their identifiers in various services.

For example, if user A wants to call user B, he selects the call function of user B on the mobile device in the contacts book.

The mobile device of user A sends a request containing the identifier of user B to a server storing a database of registered users.

The server identifies user A, who sent the request from the mobile device, and, using the identifiers of the mobile network of users A and B, organizes the connection of the aforementioned users.

When using the method of transmitting personal information, in which from all the identifiers only the identifiers of registered users are transmitted, by which users are distinguished on the server, it is possible to block the access of individual users to the opportunity to communicate with the user who is blocking.

For example, if user A doesn't want user B, to whom his contact and other personal information was previously transmitted, to call him any more, he blocks the access to his data for user B on the server, and user B will not be able to contact user A.

Since the identifier by which user B contacted user A is hidden, user B will not be able to use other mobile devices or numbers to connect with user A.

Thus, there is no need to change mobile phone numbers to users who are called by ill-wishers using different phone numbers.

In the case when the identifiers of social networks, instant messengers and mobile networks of users are stored on mobile devices, it is possible for users to use the server request to delete their contact and other personal information from the contact book of mobile devices of users to whom they previously provided their contact and other personal information.

To obtain for organizations contact and other personal information of their customers, organizations' computers are provided, for example, with fingerprint scanners for scanning biometric data of the user from whom biometric data will be scanned, and databases on these computers are provided with automatic work with a server storing contact and other personal information of registered users.

What is claimed is:

1. A method of transmitting personal information, comprising:
   receiving from a user contact information of the user and biometric data of the user, wherein the biometric data is obtained using the user's mobile device having a sensor for scanning biometric data or using specialized registration points equipped with computers with sensors for scanning biometric data;
   registering said user in a database located on a server, and linking said contact information to said biometric data;
   initiating a request containing biometric data of a registered user from a second mobile device belonging to another user different from said user, wherein said biometric data in the request is obtained by the second mobile device;
   upon receiving said request by the server, verifying that said biometric data in the request corresponds to the biometric data of the user registered in said database; and
   upon said verification, automatically transmitting by the server to the second mobile device the contact information of said user who owns said biometric data sent in the request.

2. The method of transmitting personal information, based on claim 1, wherein in addition to the contact information, other personal information provided by the user is also binded to said biometric data and provided to said another user's mobile device after a request from the second mobile device containing the registered user's biometric data is received.

3. The method of transmitting personal information, based on claim 1, wherein personal information about each individual registered user can be supplemented by other users.

4. The method of transmitting personal information, based on claim 1, wherein the provided contact information is automatically stored in the memory of a mobile device, or a social network, or in a messenger contacts database.

5. The method of transmitting personal information, based on claim 2, wherein the provided personal information is automatically stored in the memory of a mobile device, or a social network, or in a messenger contacts database.

6. The method of transmitting personal information, based on claim 2, wherein when supplementing personal information about a registered user by himself, or by other users about the aforementioned user, additional personal information is automatically transmitted to all mobile devices on which contact information of a registered user is present.

7. The method of transmitting personal information, based on claim 2, wherein contact information that is automatically transmitted to the mobile device, that is including identifiers in various mobile networks, social networks, messengers, is hidden from the user of the mobile device, and other personal information that is not including the aforementioned identifiers is not hidden from the user of the mobile device.

8. The method of transmitting personal information, based on claim 7, wherein there is an automatic transmission to the mobile device of personal information and contact information containing only one user identifier, under which the user is identified on the server storing data of registered users, and all other identifiers of the user are stored on the aforementioned server, and subsequently, the user is contacted with other users by means of server using identifiers stored on the server.

9. The method of transmitting personal information, based on claim 7, wherein mobile devices of users are provided with the ability to transmit and receive among themselves data of registered users located in a contact book of one of the mobile devices of users, communication protocols supported by user devices involved in the transmission process.

10. The method of transmitting personal information, based on claim 9, wherein mobile devices of users are provided with the ability, before transmitting the data of a registered user located in a contact book of one of the mobile devices of users, from one mobile device to another mobile device, to initiate a request addressed to the registered user, information about which is contained in a transmitted data, for permission to transmit the above data, and generate a response by a registered user, information about which is contained in the transmitted data, allowing or prohibiting transmission of the above data, and only after a response comprising permission to transmit the aforementioned data, the ability of data transmission from one mobile device to another mobile device is provided.

11. The method of transmitting personal information, based on claim 10, wherein before transmitting data of a registered user located in the contact book of one of the mobile devices of users from one mobile device to another mobile device, for determining the mobile device to which data is transmitted, the mobile device which transmits data is provided with the ability to scan biometric data of the owner of the mobile device to which the data is going to be transmitted.

12. The method of transmitting personal information, based on claim 7, wherein when transmitting personal information through announcements or advertising, personal information about a registered user is transmitted in the form of temporary identifiers with a certain shelf life, and permanent identifiers are transmitted only after permission of the user who owns the permanent identifiers.

13. The method of transmitting personal information, based on claim 8, wherein user is provided with the ability to block access to contact information and other personal data of the user stored on the server, and access is blocked for other individual users to whose mobile devices contact and other personal information of the aforementioned user was previously transmitted.

14. The method of transmitting personal information, based on claim 2, wherein the databases of commercial organizations, located on personal computers and servers which have sensors for reading biometric data and store personal data of users who are clients of the above organizations, provide the ability to automatically receive personal information from a server storing contact and other personal data of registered users, after a request containing biometric data of a registered user.

15. The method of transmitting personal information, based on claim 2, wherein upon registration, users are provided with the ability to group contact and other personal information about themselves in a mobile device for further transmission in a different amount, or by linking a different amount of information about themselves to different biometric data, and in the future, when transmitting contact and other personal information, to decide what amount and what kind of information another user will receive by providing biometric data to which the corresponding information is attached for transmission in the right amount, either by selecting a corresponding information in mobile device for transmitting it in a desired amount.

* * * * *